Dec. 26, 1967

H. BENSON ETAL  
APPARATUS FOR DETECTING FAULTS IN OR ON  
THE SURFACE OF FLAT GLASS

Filed Feb. 6, 1967

Inventors  
Harold Benson  
Albert Ruckaby  
John Reginald Beattie  
By  
Morrison, Kennedy & Campbell  
Attorneys

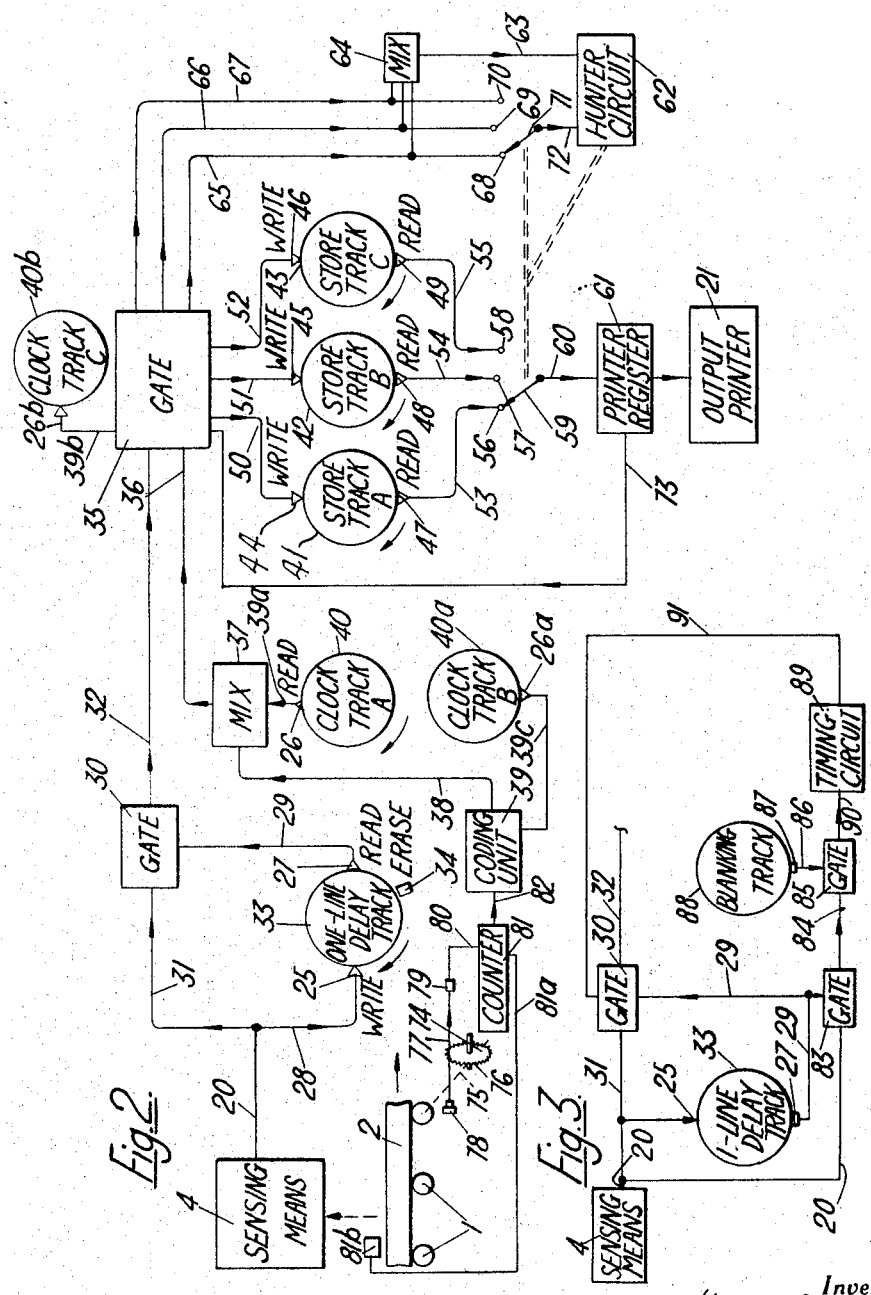

3,359,853
APPARATUS FOR DETECTING FAULTS IN OR ON THE SURFACE OF FLAT GLASS
Harold Benson, St. Helens, Albert Rickaby, Burscough, and John R. Beattie, South Maghull, near Liverpool, England, assignors to Pilkington Brothers Limited, Lancashire, England, a corporation of Great Britain
Filed Feb. 6, 1967, Ser. No. 614,166
14 Claims. (Cl. 88—14)

ABSTRACT OF THE DISCLOSURE

Apparatus for detecting faults in glass includes optical scanning means which senses contiguous strip-shaped zones of the glass as it advances past the scanning means. A photo-electric device receives an image from the scanning means and is responsive to an image of a fault in the glass to produce a fault-indicating output signal which opens a gate to cause pulses from a clock pulse generator to be recorded by a data storage device for the remainder of the scanning period. The data storage device thereby records the position of each fault relative to a side edge of the glass, and a record is subsequently made of the information in the data storage device.

---

Figure 1:
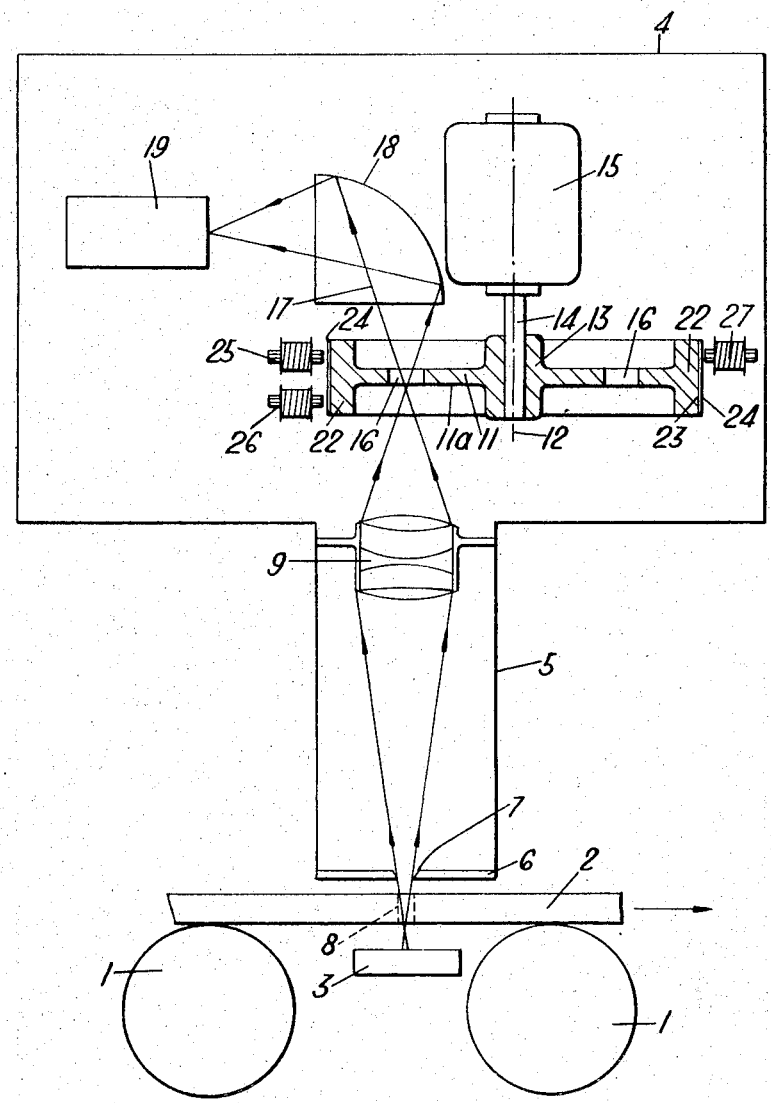

This application is a continuation-in-part of our application Ser. No. 252,496 filed Jan. 18, 1963.

This invention relates to the manufacture of flat glass and in particular to apparatus for detecting faults in or on the surface of flat glass.

Some faults which occur in flat glass take the form of inclusions in the glass such as stone or bubble. These inclusions may give rise to irregularities in the surface of the glass, or alternatively may not affect the flatness of the surface but are embedded within the body of the thickness of the glass as, for example, in the case of inclusions embedded in flat glass whose surfaces have been polished. Other faults which may occur are ream, or scratches on the surfaces of the glass.

Hitherto such faults have been located by visual inspection of the glass, a mark being made on the glass by an inspector where the fault such as a small stone or bubble, or a scratch is visible. The inspector's marks aid the cutting of the flat glass into sheets avoiding those parts of the glass where the fault or faults occur, which parts are discarded.

Because of the human factors involved such visual inspection cannot be completely satisfactory and the efficiency with which faults are observed and located varies from one inspector to another.

It is a main object of the present invention to provide an improved apparatus for detecting faults in or on the surface of flat glass so that the detection of faults is standardised, and there is consistent positive detection of faults.

According to the invention from its broadest aspect there is provided apparatus for detecting faults, for example stone, bubble, ream or scratches, in or on the surface of flat glass, comprising means for supporting and advancing the glass, optical scanning means mounted relative to the glass supporting means so as to scan step-by-step contiguous strip-shaped zones of the advancing glass, a photoelectric device mounted in the scanning means to receive an image as the scanning means scans each said zone of the glass and responsive to an image of a fault in the glass to produce a fault indicating electrical output signal, a clock pulse generator connected to the scanning means and operable to generate a train of clock pulses in synchronism with the scanning of said contiguous zones of the glass, a clock pulse gating circuit connected to the photoelectric device output and to the clock pulse generator, and a data storage device connected to the gating circuit, said clock pulse gating circuit being opened by a fault indicating signal from the photoelectric device so as to transmit clock pulses to the storage device during the remainder to the scanning period in which a fault is detected so that the number stored in the storage device at the end of the scan indicates the distance of the sensed fault from one side edge of the glass, and means for closing the gating circuit at the end of the scanning period.

Preferably according to the invention the scanning means includes an elongated light source mounted relative to said glass supporting means to illuminate uniformly an elongated region of the glass extending transversely to the direction of advance of the glass, an optical slit mounted close to the path of travel of one surface of the glass and having a length defining the length of said contiguous strip-shaped zones of the glass and a width comparable with the diameter of the smallest fault to be detected, a first optical system mounted beyond the slit to form an image of said zone of the glass, a mechanical scanner mounted relative to the slit and optical system so that an image of the zone of the glass is focussed on the scanner, and a second optical system mounted between the scanner and the photoelectric device to transmit a continuous light signal to the photoelectric device as each zone is scanned.

The number stored in the storage device may be used to make a record, for example a mark made with paint on the surface of the glass where the fault is detected. Alternatively, a separate record associated with the glass is derived. From this aspect recording means may be associated with said scanning means and includes light sensitive means responsive to an image of a fault in the glass to derive a record which is an indication of the position of the fault relative to at least one edge of the glass.

In one embodiment of the invention the elongated light source is arranged on one side of the glass to illuminate an elongated region of the glass extending transversely to the direction of said relative movement, and the co-operating optical system is arranged on the other side of the glass to receive light transmitted through a strip-shaped zone of the illuminated region of the glass.

Preferably in this embodiment of the invention the flat glass, whether in the form of a continuous ribbon or in the form of a sequence of sheets of flat glass having polished surfaces, is supported and advanced horizontally, a strip light source is mounted under the path of travel of the glass and the optical slit is mounted close to the upper side of the glass parallel to the light source to receive light transmitted through contiguous strip-shaped zones of the glass as the glass is advanced.

In another embodiment of the invention reflected light is used for the detection of faults, and from this aspect apparatus according to the invention comprises a strip light source founted horizontally over the glass, and the optical slit is mounted over the glass parallel to the light source to receive light reflected from a strip-shaped zone of the upper surface of the glass.

Preferably the mechanical scanner comprises a rotatable scanning disc so arranged relative to said optical system and zone defining slit that an image of said strip-shaped zone of the glass is projected on to one side of the disc, the disc is formed with at least one slot which scans the whole image of said zone as the disc rotates, and said light signal is transmitted through the scanning slot to the photoelectric device.

Further according to the invention the scanning disc and photoelectric device are mounted in a light-tight casing which has a downward extension which is laterally splayed and terminates in a plate in which said zone-defining optical slit is formed, and a lens system is mounted in the narrow end of said extension.

The scanning disc may be formed with a number of radial slots equispaced around the disc, and the disc is rotated at such a speed relative to the speed of advance of the glass that successive slots in the disc scan the images of contiguous strip-shaped zones of the glass defined by said slit in successive scanning periods.

Each scanning period includes the time taken by a slot in the disc to scan from one end of the line image to the other and also includes a small time interval between the end of the scan of the image by one slot and the beginning of the scan of the image by the next slot.

Still further according to the invention the scanning disc may have a flanged rim with an outer cylindrical surface co-axial with the axis of the disc, a thin layer of magnetic recording material is supported on said outer cylindrical surface, magnetic recording heads are mounted to co-operate with said cylindrical layer of magnetic material, and a track of clock pulses is recorded on said magnetic layer and is read off by one of said heads which is connected to the clock pulse gating circuit.

In this way the timing of the clock pulses is mechanically synchronized with the scanning of the line image.

The clock pulses are variably spaced around the track when the slot in the disc is a straight radial slot because the slot scans the line image formed on the disc at a non-uniform velocity. Alternatively the scanning slot in the disc may be curved so that there is automatically compensation for changes in the velocity of scan, and the velocity of scan is uniform. The clock pulses are then equispaced around the clock pulse track.

A fault occurring in the glass may be so large that it extends through a number of said contiguous strip-shaped zones of the glass so that an indication of the fault would be recorded a number of times corresponding to the number of such zones through which the fault extends. In order to ensure that only one record of the fault is made a discriminating circuit connects the output from the photo-electric device to said clock pulse gating circuit, which discriminating circuit comprises a delay circuit whose input is connected to the photoelectric device output, said delay circuit also having an output, a first normally-open gate having one input connected to the output from the delay circuit and a second input directly connected to said photoelectric device output, the output from said gate being connected to the clock pulse gating circuit and the delay introduced by the delay circuit being equal to one scanning period, whereby when a fault occurs which is large enough to be scanned several times, an output signal is passed from the photoelectric device output through the gate to the clock pulse gating circuit the first time the fault is sensed, and a delayed output signal closes the gate each subsequent time the fault is sensed so that only one indication of the position of a fault is stored in the data storage device.

The delay circuit in the discriminating circuit referred to above may in the preferred embodiment comprise a track on said cylindrical magnetic layer having a co-operating write head connected to the photoelectric device output and a read head connected to said first normally-open gate, the read head being angularly spaced from the write head in the direction of rotation of the scanning disc by an amount equal to the angular spacing of the radial scanning slots, and an erase head is arranged to erase recorded data from said track during the passage of the track from the read head to the write head.

For the detection and recording of a fault extending longitudinally along the glass, for example a scratch on the glass, apparatus according to the invention may further include a coincidence gate having two inputs respectively connected to the output of the photoelectric device and to the delay circuit read head so that after the initial detection of the fault said coincidence gate gives an output each subsequent time the fault is detected, an auxiliary track on said magnetic surface, a second normally-open gate having one input connected to the output of said coincidence gate and a second input connected to a read head co-operating with the auxiliary track on said magnetic surface, on which auxiliary track blanking pulses are permanently recorded in such a way that they are read to said second normally-open gate at the end of each scanning period to close said gate, and a timing circuit connecting the output of said second normally-open gate to said first normally-open gate, whereby when a longitudinally extended fault is detected, thereby closing said first normally-open gate after the first detection of the fault, a gate-opening pulse is transmitted to said first normally-open gate at predetermined time intervals (e.g. every 2 seconds) for as long as the fault is detected so that a record of the extension of said fault is derived.

The magnetic recording surface on the flanged rim of the scanning disc may be further utilized for storing data regarding the position of detected faults in the glass. From this aspect the apparatus includes a data storage device, at least one storage track on said cylindrical magnetic layer forming a part of the data storage device, a write head co-operating with said storage track and connected to the output of the clock pulse gating circuit, and a read head co-operating with said storage track, said apparatus further including a data recording device connected to said read head and operable to produce a record of the distance of the sensed fault from a side edge of the glass.

Preferably the data storage device comprises three storage tracks on said cylindrical layer and oppositely disposed read and write heads associated with each track, said clock pulse gating circuit includes a store selector circuit connected to the write heads and operable to switch the gate clock pulses to a free one of said storage tracks, and an output selector circuit connects the read heads to an output printer to connect the read head of the selected storage track to the printer.

In order to ensure that the correct storage track is connected to the output printer the store selector circuit may include a rotary line switch controlled by a hunter circuit actuated to start a hunting operation by a signal on any one of a plurality of store engaged signal lines which are connected to outputs from said gating circuit and are respectively energised when the storage track appropriate thereto is connected to the gating circuit data output, the store engaged signal lines being connected to contacts on said rotary line switch which are wiped by a wiper contact connected to the hunter circuit such that a signal to the hunter circuit from said wiper contact stops the hunting operation, which wiper is ganged to a second wiper contact connected to the input to the output printer and arranged to wipe over contacts individually connected to the read heads of the data storage tracks, whereby starting of said hunter circuit controls operation of the rotary line switch to connect an engaged store to the output printer.

When detecting faults in sheets of flat glass which are fed horizontally in sequence the co-ordinate position of a fault may also be recorded with respect to the front edge of the sheet and from this aspect the invention also comprehends apparatus including a pulse generator connected to the glass supporting and advancing means and operable to produce an electrical pulse, for each unit of movement of the glass (e.g. each ⅛ inch of movement), a counter connected to the pulse generator, means for sensing the front edge of an advancing sheet of glass and connected to a reset input of the counter so as to reset the counter each time a sheet is advanced past the scanning means, a coding unit connected to the counter to produce a coded output indicative of the distance of the zone being sensed from the front edge of the sheet, and means for causing transmission of a coded output from the coding unit at the end of each scanning period for transmission by the clock pulse gating circuit to the data storage device at the end of a scanning period when a fault has been sensed.

For detecting faults in relatively narrow flat glass, for example about 12" wide, only one sensing means is necessary as it extends across the whole width of the glass. However, in order to avoid undue complexity in the optical arrangements and the scanning arrangements it is preferred when detecting faults in a wider ribbon of glass or wider sheets of glass to employ a plurality of sensing means as defined above mounted side by side across the path of travel of the glass, said recording means being connected to the photoelectric device associated with each sensing means to record an indication of the position of a fault relative to a side edge of the glass. Normally, this is effected by recording along with each record of the position of a fault, the distance of the sensing means which detected the fault from the side edge of the glass. For example, when employing an output printer the record derived from each sensing means has a prefix indicating the distance of the sensing means which detected the fault from the side edge of the glass.

The invention also comprehends a method of detecting faults, for example stone, bubble, ream or scratches, in or on the surface of flat glass, comprising supporting said glass, illuminating the glass, successively forming images of contiguous strip-shaped zones of the illuminated glass, scanning the whole of each image to detect an image of any fault of the glass zone, producing a signal indicative of any said fault, and recording said signal as an indication of the position of the fault relative to at least one edge of the glass.

Figure 1A:
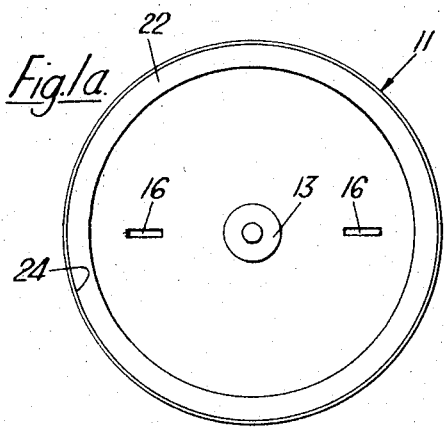
Figure 4:
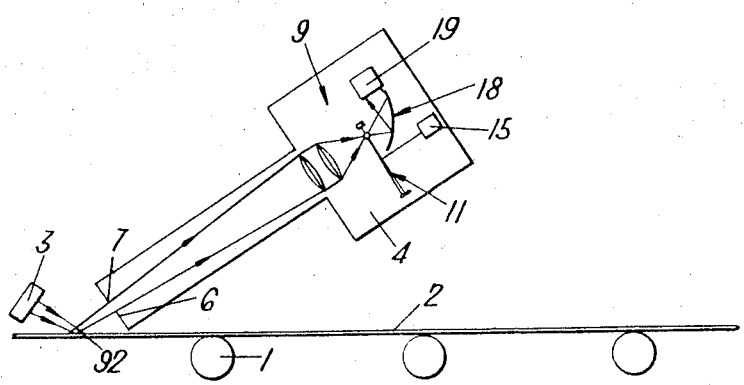

In order that the invention may be more clearly understood some embodiments thereof will now be described, by way of example, with reference to the accompanying drawings, in which:

FIGURE 1 is a sectional elevation indicating a general arrangement of sensing means according to the invention for detecting faults of flat glass, FIGURE 1a is a plan view of the scanning disc of the sensing means, FIGURE 2 is a block diagram of electrical circuits for recording the position of a fault detected by the apparatus of FIGURE 1, FIGURE 3 is a block diagram illustrating a modification to the circuit of FIGURE 2, and FIGURE 4 illustrates an application of the invention using reflected light.

In the drawings the same reference numbers indicate the same or similar parts.

Referring to FIGURES 1, 1a and 2 of the drawings, apparatus for detecting faults, for example, stone, bubble, or scratches, in or on the surface of flat glass comprises driven horizontal conveying rollers 1 on which polished plate glass 2 in sheet form is supported and advanced relative to sensing means. The sheets of polished plate glass are fed in sequence on the horizontal rollers and the sensing means for sensing faults includes a strip light source indicated at 3 mounted horizontally under the glass 2 and illuminating an elongated region of the glass extending transversely to the direction of movement of the glass. Preferably the strip light source 3 is a fluorescent tube which is mounted under the path of travel of the glass 2 parallel to the rollers 1 on which the glass is supported.

The sensing means also includes an optical system and scanning means which are mounted in a light tight casing 4 which has a downward extension 5 which is laterally splayed and terminates in a plate 6 in which an optical slit 7 is defined. The plate 6 lies just above the upper surface of the glass 2 and is parallel to that surface, and the slit 7 extends laterally parallel to the light source 3. The slit 7 therefore defines an elongated strip-shaped zone of the illuminated glass, which zone is indicated at 8.

The width of the slit 7 is comparable to the diameter of the smallest fault of the glass to be detected. For example, the slit 7 may be twelve-thousandths of an inch wide and the lower limit of the diameter of inclusions which are detected is then about ten-thousandths of an inch, this lower limit being determined by other factors in the sensing means, for example the characteristics of the optical system employed and the efficiency of the photoelectric device to be described below.

The optical system is a multiple lens system 9, which is held in a mounting 10 which is fixed in the narrow end of the extension 5 of the light tight casing.

The axis of the lens system 9 passes through the slit, and the lens system 9 is arranged to receive light transmitted through the zone 8 of the glass 2 through the slit 7, and to project an image of the zone 8 on the glass on to the undersurface of a rotatable scanning disc 11 which is illustrated in detail in FIGURE 1a, and is mounted horizontally above the optical system 9 on a vertical axis 12 which is displaced from the slit 7 in the direction of the movement of the glass 2. The image of the zone 8 which is formed on the undersurface 11a of the disc 11 is a line image extending at right angles to the radius of the disc bisecting the image. The disc 11 is integral with a central hub 13 fixed to a spindle 14 of an electric motor 15 which drives the disc.

The scanning disc 11 is formed with a number of radial slots 16 (two are shown in FIGURE 1a) which are equispaced around the disc 11 and as the disc rotates so the slots scan the whole of the image formed on its under-surface 11a from end to end and a light signal, indicated at 17, is transmitted through the slot 16 which is scanning and is focussed by a parabolic mirror 18 mounted above the upper side of the disc 11 on to a photoelectric device 19 which is preferably a photo-multiplier tube.

The disc 11 is rotated at such a speed relative to the speed of advance of the glass 2 that successive slots 16 in the disc scan the images of contiguous strip-shaped zones 8 of the glass in successive scanning periods. Each scanning period comprises the time taken for a slot 16 to scan the line image of the zone 8 from end to end together with a small time interval between the end of one scan and the start of the next scan (similar to the "flyback time" in a cathode ray tube scanner).

The common axis 12 of the motor 15 and the scanning disc 11 intersects the perpendicular bisector of the line image formed on the under-surface of the disc 11, and the axis 12 is parallel to the axis of the optical lens system 9.

As the disc 11 rotates and the line image is scanned from end to end the photomultiplier tube 19 responds to any variation of intensity in the image formed on the under-surface of the disc 11. Any defect in the glass, such as an included stone or bubble, or a scratch on the surface, causes a change in the intensity of the light transmitted through the glass from the light source 3 so that there is a local change in intensity in the line image formed on the disc 11. That is, as the line image is scanned by one of the slots 16 there will be a corresponding change in the intensity of the light signal reaching the photo-multiplier tube 19 when the scanning slot 16 passes over the image of the defective part of the glass, and this results in the production of an electrical output signal from the photomultiplier tube 19 and its associated circuits.

This electrical output signal is fed to a recording means which derives a record of the position of a fault relative to a side edge of the glass. Also when successive sheets of glass are being sensed for faults, a record is derived of the co-ordinates of the fault relative both to a side edge and to the front edge of the sheet. The output signal may be transmitted to a counter which counts the number of faults which occur.

The recording means records an electrical output signal from the photoelectric device as a record of the position of the fault, and as shown in FIGURE 2 the electrical output signal from the sensing means 4 is transmitted on a line 20 and a record is ultimately produced by an output printer 21 which may be, for example, an automatically-operated electric typewriter which prints out the co-ordinates of a fault relative to two adjacent edges of the sheet being sensed.

Often a fault is so large that it extends through several contiguous strip-shaped zones of the glass and is therefore scanned several times. An output signal is produced by the photoelectric device 19 each time the image of the fault is scanned. In order to ensure that only one record of the fault is made, the output line 20 from the photoelectric device is connected to a discriminating circuit which includes a delay circuit whose input is connected to the line 20.

The delay circuit comprises a track on a cylindrical magnetic layer supported on the scanning disc 11, FIGURE 1. To this end the scanning disc has a flanged rim 22 with an outer cylindrical surface 23 coaxial with the axis 12 of the disc. This outer cylindrical surface supports a thin layer 24 of magnetic recording material, for example a strip of wide magnetic recording tape fixed to the cylindrical surface, and two magnetic recording heads 25 and 27 are mounted to co-operate with a recording track 33 on the cylindrical layer 24 of magnetic material.

The magnetic recording head 25 is a write head connected by a line 28 to the photoelectric device output line 20, and the head 27 which is mounted diametrically opposite the write head 25 is a read head and is connected by a line 29 to one input of a first normally-open gate 30. A second input to the gate 30 is connected to the line 20 by a line 31.

The output from the gate 30 is on an output line 32 which is connected to storage circuits to be described below.

In the embodiment illustrated in FIGURES 1, 1a, and 2, there are two diametrically-opposite radial slots 16 in the scanning disc so that the delay introduced by the recording track 33 and the heads 25 and 27 is equal to one scanning period because the angular spacing of the read head 27 from the write head 25 is the same as the angular spacing of the two slots 16. An erase head 34 co-operates with the track 33 and is arranged, as shown in FIGURE 2, in such a way that it erases recorded data from the track 33 after such data has passed the read head 27 and before it reaches the write head 25.

When a fault is sensed in the zone of the glass being scanned, an output signal on line 20 from the photoelectric device is passed on line 31 to the gate 30 which is normally open. At the same time the output signal is transmitted on line 28 to the write head 25 and a pulse is recorded on the track 33. This recorded pulse is read off by the read head 27 at the same time as the fault is again being scanned by the next radial slot as it scans the image of the next zone of the glass. The pulse read from the track 33 by read head 27 on to line 29 closes gate 30 so that the output pulse on line 31 is blocked and there is no output on line 32.

This delay circuit operates to close the gate 30 each further time the fault is sensed, thereby ensuring that only the first time the fault is sensed is a pulse transmitted on line 32. Thus only one record of a fault is made. The erase head 34 erases the recorded pulse in each scanning period so that the track 33 is left clear after the fault has passed completely beneath the slit 7.

The output line 32 from the gate 30 is connected to one input of a four-input coincidence gate 35 of well-known kind which has a second input on line 36 connected to the output of a mixing circuit 37. A third input to the gate 35 is on a line 39b which is connected to a read head 26b which co-operates with a timing pulse track 40b.

On the track 40b pulses are recorded in such a way that at the end of each "fly-back time" a pulse is read by the read head 26b and causes a gate-closing signal to pass along line 39b to the gate 35. As will be described below this pulse causes the gate 35 to be closed if the detection of a fault, which would open the gate 35, has occurred during the previous scanning period. The fourth input to the gate 35 is on a line 73 which is connected to a printer register 61 whose function is described below.

The mixing circuit 37 has two inputs, one of which is connected by a line 38 to a coding unit 39 whose operation will be described below. The other input to the mixing circuit 37 is connected by a line 39a to the magnetic recording head 26 which is a read head and co-operates with a clock pulse track 40 on the magnetic surface 24. The mixing circuit 37 acts in well-known manner as an "OR" circuit and transmits an output on line 36 when either or both of its inputs on lines 38 and 39a is or are energized.

On the track 40, a sequence of clock pulses is recorded. These clock pulses are read off the track 40 by the read head 26 for transmission through the mixing circuit 37 to provide a time scale for the complete scanning of the line image formed on the under-surface of the scanning disc 11.

The clock pulses are so spaced around the track 40 that they take into account the variation in the speed of scan of the straight line image by the straight radial slot 16 because when the straight line image is scanned by the straight radial slot the speed of scan is greater at the beginning and the end of the scanning period than in the middle of the scanning period. The spacing of the clock pulses is arranged around the track 40 relative to the positions of the radial scanning slots 16 in the disc so that effectively the output from the read head 26 represents a time scale of uniformly spaced intervals. Alternatively if a slightly curved spiral scanning slot is formed in the disc then the speed of scan of the line image will be constant and the clock pulses are equispaced around the track 40.

The input lines 73 from the printer register 61 and 39b from the clock track 40b to the gate 35 normally supply "gate-opening" potentials, so that when the gate 35 receives a signal on line 32 indicating the presence of a fault in the glass, clock pulses on line 36 are transmitted through the gate 35 to one of a number of storage devices during the remainder of the scanning period in which the fault is detected. At the end of the scanning period a number of clock pulses are stored in the storage device and this number of pulses indicates the distance of the detected fault from one side edge of the glass.

The data storage device comprises, in this embodiment of the invention, three storage tracks, 41, 42 and 43 on the cylindrical magnetic layer 24. The tracks 41, 42 and 43 respectively have co-operating write heads 44, 45 and 46 and read heads 47, 48 and 49 which are each shown in FIGURE 2 disposed diametrically opposite to the appropriate write head. In a modified arrangement two separate windings on a single recording head provide read and write facilities. Referring to the arrangement shown in FIGURE 2 write heads 44, 45 and 46 are respectively connected by lines 50, 51 and 52 to outputs from the gating circuit 35 and the read heads 47, 48 and 49 are respectively connected by lines 53, 54 and 55 to fixed contacts 56, 57 and 58 of a rotary line switch forming part of a store selector circuit.

A wiper contact 59 of the rotary line switch wipes over these fixed contacts 56, 57 and 58 and the wiper contact 59 is connected by a line 60 to a printer register 61 whose output is connected to the output printer 21.

The wiper contact 59 is controlled by a hunter circuit 62 which has a start input line 63, the presence of a signal on which causes the hunter circuit 62 to move the wiper contact 59 to-and-over fixed contacts 56, 57 and 58. Start input line 63 is connected to a mixing circuit 64 which has a plurality of inputs respectively connected to store engaged signal lines 65, 66 and 67 which are connected to outputs from the gating circuit 35. The mixing circuit 64 transmits a signal on any one of lines 65, 66 and 67 to the start input line 63. Lines 65, 66 and 67 are also connected to fixed contacts 68, 69 and 70 on the rotary line switch and these fixed contacts are wiped by a wiper contact 71 which is connected by a line 72 to the stop input of the hunter circuit 62. The wiper 71 is ganged to the wiper 59. A signal on stop input line 72 causes the hunter circuit 62 to stop moving wipers 59 and 71.

When the gating circuit 35 receives an input on line 32 it selects a free one of the storage tracks 41, 42 and 43 and switches the clock pulses on line 36 to the selected track. At the same time the appropriate one of the lines 65, 66 and 67 is energised. For example, if the clock pulses are switched to track 42, then line 66 is energised.

The energisation of the line 66 causes a start input to be fed through the mixer circuit 64 to the input 63 of the hunter circuit 62 which then causes the wiper contacts 59 and 71 to move from the position indicated in FIGURE 2 to their mid-position in which they respectively engage the fixed contacts 57 and 69. Contact 69 is live because it is connected to line 66 so that a stop signal is fed on line 72 to the hunter circuit 62 which then stops moving the wipers 59 and 71. The wiper contact 59 is then engaging the fixed contact 57 so that the read head 48 of the selected track 42 is connected to the print register 61.

The print register 61 is made up of cold cathode decade tubes which are connected in series and give a parallel output to the printer circuit 21. After data stored on the track 42 has been read into the register 61 the particular cathodes of the decade tubes which are conducting energise the appropriate magnets of the output printer which then prints out the data from the track 42. The print register then sends a signal on a line 73 to the gating circuit indicating that the storage track 42 is now free and is ready to receive further data. The printer also causes an erasing direct current to flow through the read head 48 to clear the store 42. The hunter circuit 62 is then able to search for further engaged stores and to connect the appropriate read head to the print register 61.

The number of clock pulses gated through the gating circuit 35 when a fault is sensed indicates the position of the fault relative to one side edge of the glass. In order to record the second co-ordinate of the fault, namely the distance of the fault from the front edge of the sheet of glass, a pulse generator which emits a pulse for each ⅛ inch of movement of the glass is geared to the horizontal rollers 1 on which the glass 2 is advanced.

The pulse generator takes the form of a toothed wheel 74 rotatably mounted on a shaft which is geared, as indicated at 75, to the drive for the horizontal conveying rollers 1. The wheel 74 has peripheral teeth 76 which intercept a beam of light 77 projected from a light source 78 on to a photoelectric cell 79 whose output on line 80 is a succession of pulses, one for each ⅛ inch of movement of the glass 2.

Line 80 is connected to the input of a counter 81, for example a cold-cathode tube counter. A micro-switch 81b is mounted above the path of travel of the glass with its switch-actuating member just below the level of the upper surface of the glass as it is advanced on the conveying rollers 1. The micro-switch 81b is connected to the counter 81 by a line 81a, which line is connected to the reset part of the counter circuit. When the front edge of a sheet of glass is being advanced along the conveyor rollers, is sensed by the micro-switch 81b, a signal is sent along line 81a to the reset circuit of counter 81 which is reset by this signal at the beginning of the passage of each sheet of glass beneath the sensing means 4. Thus the number stored in the counter 81 at any time indicates the distance of the zone of the sheet of glass being sensed from the front edge of the sheet. The counter 81 is continually examined by the coding unit 39 which is connected to the counter by lines represented diagrammatically by the line 82, and the coding unit 39 codes the count and produces a coded output indicative of the distance of the zone 8 of the glass being sensed from the front edge of the sheet.

The coding unit 39 is associated with a further clock track 40a on the magnetic surface 24. A read head 26a actuated by pulses recorded on the clock track 40a is connected to the coding unit 39 by a line 39c. The pulses on clock track 40a are arranged such that at the beginning of each "fly-back time," a pulse actuates read head 26a to cause a signal to pass along line 39b to make the output of the coding unit 39 available on lines 38 and 36. This output only passes the gate 35 if the gate 35 is open, that is to say if a fault has been detected during the previous scanning period. The further clock track 40b already described has recorded on it pulse at spaced intervals such that at the end of each "fly-back time" a pulse actuates the read head 26b to cause a signal to pass along the line 39b to the gate 35 to reset the gate to the closed condition if a fault has been detected during the previous scanning period.

When a fault is sensed, the data which is stored in the selected one of the storage tracks 41, 42 and 43 is a number of pulses indicating the distance of the fault from a side edge of the glass sheet, followed by a coded number indicating the distance of a fault from the front edge of the sheet. This information is decoded by the print register 61 to operate the appropriate printer magnets which print out two numbers being the two co-ordinates of the fault relative to the front edge and a side edge of the sheet.

It has been bound that an effective length for the slit 7 is 12 inches and the unit of measurement of both co-ordinates of a fault is ⅛ inch so that as well as generating a pulse for each ⅛ inch of advance of the glass by the pulse generator, the clock pulses recorded permanently on the track 40 are arranged so that there is one clock pulse for each ⅛ inch of the zone of the glass whose image is being scanned. That is, there are 96 permanent clock pulses for each scanning slot on the disc.

Although the apparatus has been described with only two radial slots 16 in the scanning disc 11, it will be apparent that there may be more than two slots if greater speed of operation is desired.

In practice the width of the ribbon or sheet of glass which is being inspected is greater than 12 inches and a number of sensing means as described with reference to FIGURE 1, are mounted side by side across the path of travel of the glass with the ends of the slots 7 abutting each other so that the whole width of the glass is scanned. The photoelectric device associated with each of the sensing means is connected to the recording means which is arranged so that a prefix is automatically added to the data output from a sensing means which detects a fault, when this data is printed out by the printer 21. Since each sensing means covers 12 inches of the width of the glass then the prefix added represents the distance in feet from the edge of the glass to the nearer end of the slot 7 of the sensing means which detects a fault.

In the apparatus described above with reference to FIGURES 1 and 2, a record is derived only when a fault is initially detected. If the fault such as a stone or bubble is large enough to be detected in several successive scanning periods all subsequent sensings after the first are repressed by the closing of the first normally-open gate 30.

A scratch on the surface of the glass may, however, extend for some distance longitudinally along the glass, and in order to derive a record of the extension of such a fault, the apparatus of FIGURE 2 is modified as illustrated in FIGURE 3.

Referring to FIGURE 3, a coincidence gate 83 has two inputs respectively connected to the output line 20 from the sensing means 4, and to the line 29 which is connected to the delay circuit read head 27. The first time a fault is detected there will not be an output from the gate 83, but each subsequent time a fault is detected the gate 83 gives an output.

If the fault is small the train of output pulses from the gate 83 is short-lived, but when the fault is a scratch extending longitudinally of the glass the output pulse train is correspondingly long.

The output of the gate 83 is connected by a line 84 to one input of a second normally-open 85, which has a second input connected by a line 86 to a read head 87 co-operating with an auxiliary track 88 on the magnetic surface 24. Blanking pulses are permanently recorded around the auxiliary track 88 and are so spaced around the track relative to the positions of the scanning slots 16 that a blanking pulse is fed on line 86 to the gate 85 at the end of each scanning period. This pulse on line 86 closes the gate 85 for the whole of the "fly-back" time between scanning periods so that signals generated by the photoelectric device 19 at the end of each scanning period, caused by the obtruation of the light by the disc before the next slot begins its scan, are not transmitted through the gate 85 and are not recorded.

A timing circuit 89 is connected by a line 90 to the output from the gate 85, and the output of the timing circuit 89 is connected by a line 91 to the first gate 30, which is initially closed by a pulse on line 29 when a fault is detected. The timing circuit 89 gives an output on line 91 at predetermined time intervals, e.g. every 2 seconds, for as long as the gate 83 produces a train of coincidence pulses on line 84, and the periodic pulses on line 91 open the gate 30 to allow pulses to be fed to the store and subsequently to the printer at regular time intervals for as long as the fault is detected so that the printer produces a record of the longitudinal extension of the fault.

FIGURE 4 illustrates a modified arrangement according to the invention for the detection of faults of flat glass 2 by means of light reflected from the surfaces of the glass. In this arrangement the light source 3 is mounted horizontally over the glass transversely to the direction of movement of the glass, and is arranged to illuminate the upper surface of the glass. Instead of being mounted vertically as in FIGURE 1, the sensing device in its casing 4 is mounted at an angle to the glass so that light reflected from the surfaces of the glass enters the slit 7 which defines a strip-shaped zone 92 of the illuminated upper surface of the glass. The ouput signal from the photo-electric device 19 is used to derive a record of faults on the surfaces of the glass in the manner described above.

In another arrangement according to the invention which is particularly suitable for the detection of bubble in the glass, light from a line source is directed obliquely on to the underface of the glass and is brought to the focus in the mid-plane of the glass by a cylindrical lens. Normally the light passes through the glass without entering the optical slit 7 shown in FIGURE 1 which is positioned over the illuminated region of the glass, but if a bubble occurs light is scattered into the slit 7 and an output signal is produced by the photoelectric device 19.

Ream, ream knots and surface dimples may be detected by a further modification of apparatus according to the invention. In this modification the underside of the glass is illuminated by a point source, for example a high pressure mercury lamp and a shadow graph of the illuminated region of the glass is formed on an opalescent screen placed above the glass and below the slit 7. As the shadow of the fault passes beneath the slit 7 there is a local change in the light intensity in the image formed on the scanning disc, and an output signal indicative of the presence of the fault is produced.

The apparatus for detecting faults described above would normally be employed for scanning sheets of glass which are taken out of the warehouses and are on their way to being cut up to satisfy customers' requirements. The printed output for each sheet of glass can, therefore, be attached to the sheet as it passes through to the cutters who can then mark up the faults in the sheet from the printed information before they commence cutting.

Alternatively the apparatus can be employed for sensing and detecting faults in a continuous ribbon of glass emerging, for example, from a horizontal or vertical annealing lehr. In this case the co-ordinates of a fault in the longitudinal direction of the ribbon is determined with reference to a reference mark made in the margin of the ribbon which reference mark occurs periodically and resets the counter 81.

Instead of printing out the information obtained when either sensing a ribbon or a sheet of glass for faults, a record may be made directly on the glass by means of an automtatic marking device which is controlled by the output data representing the position of a fault and makes a mark on the glass automatically where the fault occurs, for example the glass may be marked with a dab of paint.

In one embodiment a bank of marking heads is located above and extends across the path of travel of the glass. There may be a marking head for each ½ inch or each ¼ inch of the width of the glass. When a fault is detected, an electronic selector is operated by the pulses on lines 32 and 36 to select the appropriate marking head which is energised to mark the surface of the glass after the elapsing of a period of time corresponding to the time taken by the fault to travel from the scanner to the marking heads, this distance being kept as short as possible.

Alternatively instead of a bank of marking heads a single marking head may be mounted above the glass on traversing means, so that the head is traversed across the upper surface of the glass, there being one marking head for each scanner. The traversing means is controlled by the signals on lines 32 and 36 and when a fault is detected the head is positioned above the path of the fault, and a mark is made on the glass at the appropriate time when the fault is under the marking head.

In another application the information obtained regarding the position of faults may be employed in a computer connected to an automatic cutter. The computer computes the most economical way of cutting up the glass having regard to the faults present, and customers' requirements. The computer output is either employed to mark the glass where cuts are to be made, or is employed to operate automatic transverse and/or longitudinal cutters to make the required cuts.

Although the apparatus has been described with reference to the use of photoelectric devices such as a photomultiplier tube for producing an electrical output signal indicative of a fault, other light sensitive means may be employed, for example, the continuous light signal from the scanning disc may be recorded on a moving film. Further the scanning means may work in conjunction with a cathode ray tube which produces on its face a raster synchronised with the scanning of the image, the brightness of the scanning spot being controlled by the output from the photoelectric device and a film record being made of the raster. Alternatively the sensing means may employ a technique in which the image is formed on a photo-sensitive surface which is then electronically scanned to produce the electrical output signal.

In the embodiment described the surface of the edge of the scanning disc is employed to support magnetic storage tracks so that synchronism between the operation of the mechanical scanning and the operation of the magnetic storage devices is assured. Other storage devices may, however, be employed, for example, magnetic core storage devices which are controlled by clock pulses produced from a magnetic track on the scanning disc. Alternatively clock pulses may be produced from a series of marks or teeth on the scanning disc which are photoelectrically sensed in the manner of a "phonic wheel."

When employing magnetic core storage it is advantageous to feed the gated clock pulses from the gating circuit 35 to a serial counter which produces a coded output for storage in the magnetic cores. In such a circuit the hunter circuit and radial line switch may be replaced by conventional gating and switching circuits for selecting and switching the appropriate connections from the stores to the output printer.

We claim:

1. Apparatus for detecting faults, for example stone, bubble, ream or scratches in or on the surface of flat glass, comprising means for supporting and advancing the glass, optical scanning means mounted relative to the glass supporting means so as to scan step-by-step contiguous strip-shaped zones of the advancing glass, a photoelectric device mounted in the scanning means to receive an image as the scanning means scans each said zone of the glass and responsive to an image of a fault in the glass to produce a fault indicating electrical output signal, a clock pulse generator connected to the scanning means and operable to generate a train of clock pulses in synchronism with the scanning of said contiguous zones of the glass, a clock pulse gating circuit connected to the photoelectric device output and to the clock pulse generator, and a data storage device connected to the gating circuit, said clock pulse gating circuit being opened by a fault indicating signal from the photoelectric device so as to transmit clock pulses to the storage device during the remainder of the scanning period in which a fault is detected so that the number stored in the storage device at the end of the scan indicates the distance of the sensed fault from one side edge of the glass, and means for closing the gating circuit at the end of the scanning period.

2. Apparatus according to claim 1, wherein the scanning means includes an elongated light source mounted relative to said glass supporting means to illuminate uniformly an elongated region of the glass extending transversely to the direction of advance of the glass, an optical slit mounted close to the path of travel of one surface of the glass and having a length defining the length of said contiguous strip-shaped zones of the glass and a width comparable with the diameter of the smallest fault to be detected, a first optical system mounted beyond the slit to form an image of said zone of the glass, a mechanical scanner mounted relative to the slit and optical system so that an image of the zone of the glass is focussed on the scanner, and a second optical system mounted between the scanner and the photoelectric device to transmit a continuous light signal to the photoelectric device as each zone is scanned.

3. An apparatus according to claim 2, wherein the glass is supported and advanced horizontally, a strip light source is mounted under the path of travel of the glass and the optical slit is mounted close the upper side of the glass parallel to the light source to receive light transmitted through contiguous strip-shaped zones of the glass as the glass is advanced.

4. Apparatus according to claim 2, wherein the glass is supported and advanced horizontally, a strip light source is mounted horizontally over the glass, and the optical slit is mounted over the glass parallel to the light source to receive light reflected from a strip-shaped zone of the upper surface of the glass.

5. Apparatus according to claim 2, wherein the mechanical scanner comprises a rotatable scanning disc so arranged relative to said optical system and zone defining slit that an image of said strip-shaped zone of the glass is projected on to one side of the disc, the disc is formed with at least one slot which scans the whole image of said zone as the disc rotates, and said light signal is transmitted through the scanning slot to the photoelectric device.

6. Apparatus according to claim 5, wherein the scanning disc and photoelectric device are mounted in a light-tight casing which has a downward extension which is laterally splayed and terminates in a plate in which said zone-defining optical slit is formed, and a lens system is mounted in the narrow end of said extension.

7. Apparatus according to claim 6, wherein the scanning disc is formed with a number of radial slots equispaced around the disc, and the disc is rotated at such a speed relative to the speed of advance of the glass that successive slots in the disc scan the images of contiguous strip-shaped zones of the glass defined by said slit in successive scanning periods.

8. Apparatus according to claim 7, wherein the scanning disc has a flanged rim with an outer cylindrical surface co-axial with the axis of the disc, a thin layer of magnetic recording material is supported on said outer cylindrical surface, magnetic recording heads are mounted to co-operate with said cylindrical layer of magnetic material, and a track of clock pulses is recorded on said magnetic layer and is read off by one of said heads which is connected to the clock pulse gating circuit.

9. Apparatus according to claim 8, including a discriminating circuit connecting the output from the photoelectric device to said clock pulse gating circuit, which discriminating circuit comprises a delay circuit whose input is connected to the photoelectric device output, said delay circuit also having an output, a first normally-open gate having one input connected to the output from the delay circuit and a second input directly connected to said photoelectric device output, the output from said gate being connected to the clock pulse gating circuit and the delay introduced by the delay circuit being equal to one scanning period, whereby when a fault occurs which is large enough to be scanned several times, an output signal is passed from the photoelectric device output through the gate to the clock pulse gating circuit the first time the fault is sensed, and a delayed output signal closes the gate each subsequent time the fault is sensed so that only one indication of the position of a fault is stored in the data storage device.

10. Apparatus according to claim 9, wherein the delay circuit comprises a track on said cylindrical magnetic layer having a co-operating write head connected to the photoelectric device output and a read head connected to said first normally-open gate, the read head being angularly spaced from the write head in the direction of rotation of the scanning disc by an amount equal to the angular spacing of the radial scanning slots, and an erase head is arranged to erase recorded data from said track during the passage of the track from the read head to the write head.

11. Apparatus according to claim 10, including, for the detection and recording of a fault extending longitudinally along the glass, a coincidence gate having two inputs respectively connected to the output of the photoelectric device and to the delay circuit read head so that after the initial detection of the fault said coincidence gate gives an output each subsequent time the fault is detected, an auxiliary track on said magnetic surface, a second normally-open gate having one input connected to the output of said coincidence gate and a second input connected to a read head co-operating with the auxiliary track on said magnetic surface, on which auxiliary track blanking pulses are permanently recorded in such a way that they are read to said second normally-open gate at the end of each scanning period to close said gate, and a timing circuit connecting the output of said second normally-open gate to said first normally-open gate, whereby when a longitudinally extended fault is detected, thereby closing said first normally-open gate after the first detection of the fault, a gate-opening pulse is transmitted to said first normally-open gate at predetermined time intervals for as long as the fault is detected so that a record of the extension of said fault is derived.

12. Apparatus according to claim 10, including a data storage device, at least one storage track on said cylindrical magnetic layer forming a part of the data storage device, a write head co-operating with said storage track and connected to the output of the clock pulse gating circuit, and a read head co-operating with said storage track, said apparatus further including a data recording device connected to said read head and operable to produce a record of the distance of the sensed fault from a side edge of the glass.

13. Apparatus according to claim 12, wherein the data storage device comprises three storage tracks on said cylindrical layer and oppositely disposed read and write heads associated with each track, said clock pulse gating circuit includes a store selector circuit connected to the write heads and operable to switch the gate clock pulses to a free one of said storage tracks, and an output selector circuit connects the read heads to an output printer to connect the read head of the selected storage track to the printer.

14. Apparatus according to claim 1, for detecting faults in sheets of flat glass fed horizontally in sequence, including a pulse generator connected to the glass supporting and advancing means and operable to produce an electrical pulse for each unit of movement of the glass, a counter connected to the pulse generator, means for sensing the front edge of an advancing sheet of glass and connected to a reset input of the counter so as to reset the counter each time a sheet is advanced past the scanning means, a coding unit connected to the counter to produce a coded output indicative of the distance of the zone being sensed from the front edge of the sheet, and means for causing transmission of a coded output from the coding unit at the end of each scanning period for transmission by the clock pulse gating circuit to the data storage device at the end of a scanning period when a fault has been sensed.

References Cited

UNITED STATES PATENTS 3,176,306    3/1965    Burns _____ 250—219 X

JEWELL H. PEDERSEN, *Primary Examiner.*

C. E. QUARTON, *Assistant Examiner.*